(12) United States Patent
Seifert et al.

(10) Patent No.: US 9,524,511 B2
(45) Date of Patent: *Dec. 20, 2016

(54) METHOD AND A SYSTEM FOR ANALYSING TRAFFIC ON A WEBSITE BY MEANS OF PATH ANALYSIS

(71) Applicant: SITECORE A/S, København V (DK)

(72) Inventors: Michael Seifert, Charlottenlund (DK); Jeppe Grue, København V (DK)

(73) Assignee: SITECORE A/S, Copenhagen V. (DK)

(*) Notice: Subject to any disclaimer, the term of this patent is extended or adjusted under 35 U.S.C. 154(b) by 0 days.

This patent is subject to a terminal disclaimer.

(21) Appl. No.: 14/929,934

(22) Filed: Nov. 2, 2015

(65) Prior Publication Data

US 2016/0055520 A1  Feb. 25, 2016

Related U.S. Application Data

(63) Continuation of application No. 12/974,960, filed on Dec. 21, 2010, now Pat. No. 9,177,321.

(51) Int. Cl.
  *G06Q 30/02* (2012.01)
  *G06F 17/30* (2006.01)
  *H04L 29/08* (2006.01)

(52) U.S. Cl.
  CPC ....... *G06Q 30/0244* (2013.01); *G06F 17/3089* (2013.01); *G06Q 30/02* (2013.01);
  (Continued)

(58) Field of Classification Search
  None
  See application file for complete search history.

(56) References Cited

U.S. PATENT DOCUMENTS 6,982,708 B1  1/2006 Mah et al.
7,020,643 B2  3/2006 Mah et al.
(Continued)

FOREIGN PATENT DOCUMENTS

WO  WO 01/57706 A2  8/2001
WO  WO 02/27529 A2  4/2002

*Primary Examiner* — Greg C Bengzon
(74) *Attorney, Agent, or Firm* — Birch, Stewart, Kolasch & Birch, LLP (57) ABSTRACT

A method and a system for analyzing traffic on a website are disclosed, the website being arranged on a server. The method comprises the steps of allowing a plurality of visitors to visit the website; for each visit, registering a sequence of pages viewed by the visitor and/or actions performed by the visitor during the visit; for each visit, monitoring navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit; and defining a set of visits from the plurality of visits. Path patterns are built based on the visits of the set of visits, where the registered sequences form the path patterns, the path patterns including one or more full path patterns, each full path pattern corresponding to a complete registered sequence of at least one visit, and for each full path pattern, a total path value is calculated being the sum of accumulated value point scores for all visits with registered sequences forming said full path pattern. Correlated information regarding the paths followed by the visitors and the value generated by the visitors during their visits is thereby obtained. This can be used for investigating which paths generate value for the website owner, and which do not. The website may then be adjusted to encourage value generating behavior.

23 Claims, 5 Drawing Sheets (52) U.S. Cl.
CPC ......... *G06Q 30/0246* (2013.01); *H04L 67/02* (2013.01); *H04L 67/22* (2013.01)

(56) References Cited

U.S. PATENT DOCUMENTS

| | | | |
|---|---|---|---|
| 7,523,087 B1 | 4/2009 | Agarwal et al. | |
| 7,624,173 B2 | 11/2009 | Bary et al. | |
| 7,644,134 B2 | 1/2010 | Cohen et al. | |
| 7,917,382 B2 | 3/2011 | Cereghini et al. | |
| 8,234,582 B1 | 7/2012 | Haynes et al. | |
| 8,250,473 B1 | 8/2012 | Haynes et al. | |
| 8,341,540 B1 | 12/2012 | Haynes et al. | |
| 2002/0010715 A1 | 1/2002 | Chinn et al. | |
| 2002/0147772 A1* | 10/2002 | Glommen | G06Q 30/02 709/203 |
| 2002/0147805 A1 | 10/2002 | Leshem et al. | |
| 2003/0051031 A1 | 3/2003 | Streble | |
| 2003/0154237 A1 | 8/2003 | Mah et al. | |
| 2004/0003351 A1 | 1/2004 | Sommerer et al. | |
| 2004/0059746 A1 | 3/2004 | Error et al. | |
| 2004/0095383 A1 | 5/2004 | Pfeifer et al. | |
| 2004/0174397 A1* | 9/2004 | Cereghini | G06Q 30/02 715/855 |
| 2006/0036400 A1 | 2/2006 | Kasriel et al. | |
| 2006/0064339 A1 | 3/2006 | Allred | |
| 2006/0277198 A1 | 12/2006 | Error et al. | |
| 2008/0181463 A1* | 7/2008 | Error | H04L 67/36 382/113 |
| 2008/0189408 A1 | 8/2008 | Cancel et al. | |
| 2008/0201357 A1 | 8/2008 | Error et al. | |
| 2008/0235622 A1 | 9/2008 | Chand et al. | |
| 2009/0193360 A1* | 7/2009 | Escuer | G06Q 10/06 715/810 |
| 2009/0327050 A1 | 12/2009 | Fishteyn et al. | |
| 2010/0042487 A1 | 2/2010 | Barazani | |
| 2010/0169177 A1 | 7/2010 | Griffith et al. | |
| 2010/0251128 A1 | 9/2010 | Cordasco | |
| 2011/0246289 A1 | 10/2011 | Bowman et al. | |
| 2011/0264673 A1 | 10/2011 | White et al. | |
| 2011/0307509 A1 | 12/2011 | Hsiao et al. | |
| 2011/0307515 A1 | 12/2011 | Chen et al. | |
| 2012/0116868 A1 | 5/2012 | Chin et al. | |

* cited by examiner

METHOD AND A SYSTEM FOR ANALYSING TRAFFIC ON A WEBSITE BY MEANS OF PATH ANALYSIS

CROSS REFERENCE TO RELATED APPLICATION

This application is a Continuation of co-pending application Ser. No. 12/974,960 filed on Dec. 21, 2010, the entire contents of which are hereby incorporated by reference into the present application.

FIELD OF THE INVENTION

The present invention relates to a method and a system for analysing traffic on a website, where path patterns are built on the basis of registered sequences of pages viewed by visitors and/or actions performed by visitors during visits to the website.

BACKGROUND OF THE INVENTION

For website owners it is often desirable to be able to analyse the traffic on a website, e.g. in order to determine which visitor behaviour leads to increased value for the website owner, and which visitor behaviour does not. By gaining such knowledge, the website owner may adjust or redesign the website in a manner which encourages the value creating or increasing behaviour.

Various analytic tools exist which provide the website owner with information regarding the amount of traffic on the website, including the origin of the traffic. Google® Analytics is one example of such a tool. However, these tools provide no information regarding the quality of the traffic, i.e. it is not possible to derive which part of the traffic was successful with respect to achieving the goals of the website owner.

U.S. Pat. No. 7,020,643 B2 discloses a system and method for extracting funnels from at least one input clickstream representing an ordered path of successively viewed web pages. The clickstreams are stored in one or more tree structures in one scan, then traverses each tree structure to identify funnels satisfying input criteria, such as depth criteria, width criteria, starting page criteria or end page criteria.

DESCRIPTION OF THE INVENTION

It is an object of embodiments of the invention to provide a method for analysing traffic on a website, which allows a website owner or manager to obtain detailed information regarding value generating behaviour of visitors visiting the website.

It is a further object of embodiments of the invention to provide a method for analysing traffic on a website, which enables a website owner or manager to identify value generating and value losing paths of the website.

It is an even further object of embodiments of the invention to provide a method for analysing traffic on a website, which enables a website owner or manager to adjust the website to encourage value generating behaviour of visitors visiting the website.

It is an even further object of embodiments of the invention to provide a system for analysing traffic on a website, which allows a website owner or manager to obtain detailed information regarding value generating behaviour of visitors visiting the website.

According to a first aspect the invention provides a method for analysing traffic on a website, the website being arranged on a server, the method comprising the steps of:
  allowing a plurality of visitors to visit the website,
  for each visit, registering a sequence of pages viewed by the visitor and/or actions performed by the visitor during the visit,
  for each visit, monitoring navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit,
  defining a set of visits from the plurality of visits,
  building path patterns based on the visits of the set of visits, where the registered sequences form the path patterns, the path patterns including one or more full path patterns, each full path pattern corresponding to a complete registered sequence of at least one visit, and
  for each full path pattern, calculating a total path value being the sum of accumulated value point scores for all visits with registered sequences forming said full path pattern.

In the present context the term 'website' should be interpreted to mean a collection of related web pages, images, videos or other digital assets being addressed relative to a common Uniform Resource Locator (URL). The web pages of the website may advantageously be designed, presented and linked together to form a logical information resource and/or transaction initiation function. According to the first aspect of the invention, the website being managed is arranged on, or hosted on, a server. The server, and thereby the website, is typically accessible via a data network, such as the Internet or a Local Area Network (LAN). It should be noted that, in the present context, the term 'server' should be interpreted to cover a single device as well as two or more individual devices being interlinked in such a manner that they, to a visitor of the website, seem to act as a single device.

In the present context the term 'traffic on a website' should be interpreted to mean visitors visiting the website, navigating within the website and performing actions within the website.

According to the method of the first aspect of the invention, a plurality of visitors is initially allowed to visit the website. During each visit, a sequence of pages viewed by the visitor and/or actions performed by the visitor is registered. Thus, the registered sequence reflects the pages viewed by the visitor and the actions performed by the visitor during the visit, and the order in which they occurred. Accordingly, the registered sequence corresponds to the visitors 'path' through the website during the visit.

For each visit the navigations and/or actions performed by the visitor during the visit are monitored, while accumulating value points. Value point settings have previously been associated with content of the website, and the value points of a given visit are accumulated in accordance with these settings, and in accordance with the navigations and/or actions performed by the visitor. Thus, when a visitor encounters a specific piece of content, the value points are adjusted with an amount corresponding to the value point setting associated with that piece of content.

In the present context the term 'content' should be interpreted to include anything which a visitor may experience during a visit to the website, including content presented to the visitor, such as web pages, images, video sequences, audible sequences, etc., actions performed by the visitor, including forms being filled in, searches performed within the website, tests, polls, etc., or any other kind of content which the visitor may experience or encounter during a visit to the website.

Accordingly, at the end of a visit, an accumulated value point score has been obtained, which reflects the value points 'collected' by the visitor during the visit. If the value point settings are selected and assigned in an appropriate manner, the accumulated value point score may reflect the value which the visit generated to the website owner, i.e. it is a measure for how valuable the visit was.

Next, a set of visits is defined from the plurality of visits. The set of visits may include all of the plurality of visits, or it may form a subset of the plurality of visits. In the case that the set of visits forms a subset of the plurality of visits, the set of visits may be selected on the basis of various criteria, such as visits referred to the website from a specific referral or a specific type of referral, visitors visiting the website during a specific time period, visitors from a specific geographical region, etc.

Next, path patterns are built based on the visits of set of visits. The registered sequences originating from these visits form the path patterns. Thus, the path patterns illustrate the navigations and actions performed by the visitors of the set of visits during their visits to the website.

The path patterns include one or more full path patterns, each full path pattern corresponding to a complete registered sequence of at least one visit. For each full path pattern a total path value is calculated as the sum of accumulated value point scores for all visits with registered sequences forming said full path pattern. Thus, the total path value of a given full path pattern reflects the value generated for the website owner during the visits of the set of visits which followed the path of the full path pattern.

Accordingly, the path patterns along with the calculated total path values provides information to the website owner or manager regarding which registered sequences of pages and/or actions generate value for the website owner and which do not. This information can be used as a basis for investigating why following certain paths on the website results in value being generated for the website owner, while following other paths does not. This may, e.g., reveal inexpedient features or design at the website and allow the website owner or manager to adjust or remove such features or design, thereby potentially increasing the total value generated by visitors visiting the website.

The method may further comprise the step of identifying a most efficient full path being the full path with the highest total path value per visit in the full path. Thus, the most efficient full path is the full path which generates the highest value per visit. However, it might not be the full path which generates the highest total value, because a less efficient path may have more visitors, thereby generating a higher total value.

The method may further comprise the step of storing the path patterns along with the total path values in a storage device of the server. According to this embodiment, the obtained information is stored, and may thereby be used at a later point in time, e.g. for analysis purposes.

The method may further comprise the steps of:
for each visit, storing information regarding navigations and/or actions performed by the visitor during the visit, along with the accumulated value point score of the visit, in a storage device of the server, and
retrieving the stored information from the storage device prior to performing the step of building path patterns.

According to this embodiment, various relevant information regarding the navigations and/or actions performed by the visitor during the visit is stored along with the accumulated value point score in immediate continuation of the visit. At a later point in time, the stored information is retrieved, and the path patterns are built on the basis of the retrieved information. According to this embodiment, building of the path patterns may be postponed until a sufficient number of visitors have visited the website to allow meaningful path patterns to be built. Furthermore, the step of building the path patterns may be performed by a different application and/or at a different device than the step of monitoring the navigations and/or actions performed by the visitor during the visit.

The path patterns may further include at least one partial path pattern, each partial path pattern corresponding to a part of a registered sequence of at least one visit. According to this embodiment, the path patterns include full path patterns as well as partial path patterns. It should be noted that a path pattern which constitutes a partial path pattern with respect to one visit may constitute a full path pattern with respect to another visit. According to this embodiment, the path patterns provide a complete overview of how the visitors of the set of visitors have navigated the website.

The method may further comprise the steps of:
analysing each partial path pattern, and
for each partial path pattern, identifying a value point loss for said partial path pattern, based on the analysis step.

According to this embodiment, the website owner or manager obtains information regarding which parts of the paths followed by the visitors result in loss of value points, i.e. which parts of the paths leads to visitor behaviour which is undesirable with respect to obtaining desired goals for the website owner. Once such information has been obtained, the website owner or manager may adjust the website in order to improve the parts of the website which appear to result in value loss, thereby increasing the total value generated for the website owner during visits.

The path patterns may form an ordered tree data structure, where the pages and/or actions of the registered sequences form nodes of the ordered tree data structure. The ordered tree data structure may, e.g., be in the form of a TRIE.

In this case, the path patterns may further include at least one partial path pattern, each partial path pattern corresponding to a part of a registered sequence of at least one visit, and the ordered tree data structure may be formed by full path patterns as well as partial path patterns.

The method may further comprise the steps of:
for each visit, defining an exit node as the node where the visit ends, and assigning an exit value to the exit node, the exit value being the accumulated value point score for the visit, and
for each node, calculating a total exit value being the sum of all exit values assigned to the node.

Thus, the total exit value for a node represents the total number of value points 'leaving' the website via the node.

The method may further comprise the step of assigning an exit count to each exit node, the exit count being the number of visits ending at said exit node. Thus, the exit count of a node represents the number of visitors leaving the website via the node.

The method may further comprise the step of, for each exit node, calculating a total exit efficiency per visit being the total exit value divided by the exit count. Whereas the total exit value and the exit count are quantitative measures, the total exit efficiency per visit is a qualitative measure in the sense that it provides information regarding how efficient each visit leaving the website via the exit node is on average.

The total exit value, the exit count and the total exit efficiency per visit each provide useful information to the website owner or manager, in particular when evaluated in combination. For instance, a high total exit value for a given node indicates that paths ending at that node generate high value for the website owner. However, this may be primarily due to a high exit count, while the total exit efficiency per visit may be relatively low. In this case an analysis will reveal to the website owner or manager that the value generated for the website owner can easily be increased by improving the total exit efficiency per visit. Similarly, an exit node with high total exit efficiency per visit may have a relatively low total exit value, if the exit count is low. In this case the value generated for the website owner can be increased by increasing the exit count of the node. Once this has been realised, the website owner or manager may adjust the website in order to encourage behaviour of visitors which helps obtaining increased exit value per visit or increased exit count.

The method may further comprise the steps of:
for each visit, assigning a node value to each node visited during the visit, the node value being the accumulated value point score for the visit, and
for each node, calculating a total node value being the sum of all node values assigned to the node.

The node value is similar to the exit value described above. However, whereas the exit value provides information regarding the value points leaving the website via the node, the node value provides information regarding the total value generated by all visits which included the node, regardless of whether or not the visit was terminated at the node.

The method may further comprise the step of assigning a node count to each node, the node count being the number of visits visiting said node. This is similar to the exit count, and the remarks set forth above with respect to the node value are also applicable here.

The method may further comprise the step of, for each node, calculating a total node efficiency per visit being the total node value divided by the node count.

Similarly to what is described above, the total node value, the node count and the total node efficiency per visit each provide useful information to the website owner regarding how the website can be improved to increase the total value generated for the website owner during the visits to the website.

The method may further comprise the step of storing the ordered tree data structure along with the total node values in a storage device of the server. According to this embodiment, the ordered tree data structure may be used at a later point in time, e.g. for analysis purposes, and/or in order to compare navigations and/or actions of a subsequent visitor to the ordered tree data structure.

The method may further comprise the step of analysing the ordered tree data structure and the node values.

In this case the method may further comprise the step of identifying a most valuable full path of the ordered tree data structure, based on the analysis step. The most valuable full path may, e.g., be the full path having an exit node with the highest total exit value.

Alternatively or additionally, the method may further comprise the step of identifying a most efficient full path of the ordered tree data structure, based on the analysis step. The most efficient full path may, e.g., be the full path having an exit node with the highest total exit efficiency per visit.

Alternatively or additionally, the method may further comprise the step of identifying a most valuable node of the ordered tree data structure, based on the analysis step. The most valuable node may, e.g., be the node having the highest total exit value and/or the highest total node value.

Alternatively or additionally, the method may further comprise the step of identifying a most efficient node of the ordered tree data structure, based on the analysis step. The most efficient node may, e.g., be the node having the highest exit efficiency per visit and/or the highest node efficiency per visit.

Alternatively or additionally, the method may further comprise the step of for each node of the ordered tree data structure, identifying a value point loss for said node, based on the analysis step. The value point loss for a node reflects how much potential value is lost via the node or due to the node. For example, on any given node in the ordered tree data structure, the exit efficiency and the node efficiency of each of the child nodes can be correlated. They can e.g. be correlated relative to the efficiency of the node being analysed, or one of that node's parent nodes. By comparing and correlating these efficiencies and by looking at the number of visits going to each child node or exiting, the website owner or manager can see how many value points are lost or can be gained by visits going in different directions. Based on this knowledge the website owner or manager can try to redesign the site to reinforce positive behaviour and diminish negative behaviour, e.g. by encouraging visitors towards the more effective paths via, e.g., information architecture redesign.

The method may further comprise the steps of:
identifying one or more statistically insignificant nodes of the ordered tree data structure,
pruning the ordered tree data structure by removing said statistically insignificant node(s) and any descendant nodes of the statistically insignificant node(s) from the ordered tree data structure, and
for each of the remaining nodes of the ordered tree data structure, assigning a prune value and a prune count being the sum of accumulated value points and visits of removed nodes descending from said node.

According to this embodiment, the ordered tree data structure is pruned if it is revealed that a part of the ordered tree data structure is insignificant. This conserves space of the ordered tree data structure and makes the analysis easier and more efficient.

The method may further comprise the steps of:
at least one visitor filling out a set of form fields of a form during the visit,
for each visitor, registering whether a form was dropped or submitted, and
in the case that the form was submitted, registering whether the submission was a success or a failure.

In this case the method may further comprise the step of building path patterns, based on the registered information, said path patterns defining at least a form drop pattern, a form submit success pattern and a form submit failure pattern. According to this embodiment, the website owner or manager obtains information regarding how filling in a form affects the value generated during the visit. Furthermore, the form drop pattern(s) enable(s) the website owner or manager to investigate why a form is dropped. This may, e.g., be because the design of the form contains inexpediencies, and the form drop pattern(s) allow(s) the website owner or manager to reveal such inexpediencies and correct them.

Similarly, the form submit success pattern(s) and/or the form submit failure pattern(s) enable the website owner or manager to investigate why some submitted forms succeed and some fail, and thereby the form may be adjusted in order to increase the success rate.

At least the step of registering whether a form was dropped or submitted may be performed on the basis of the set of filled out form fields and/or on interactive form feedback.

The method may further comprise the steps of:
analysing the path patterns, and
calculating a most common form drop-out path and/or a most common form submit failure path and/or a most common form submit success path, based on the analysis step.

This analysis may help in revealing inexpediencies in the form, thereby allowing such inexpediencies to be removed from the form.

According to a second aspect the invention provides a system for analysing traffic on a website arranged on a server, the system comprising:
a registering module adapted to register a sequence of pages viewed by a visitor and/or actions performed by a visitor during a visit to the website, and to monitor navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit, and
an analysis module adapted to build path patterns based on the visits of a defined set of visits, where the registered sequences form the path patterns, the path patterns including one or more full path patterns, each full path pattern corresponding to a complete registered sequence of at least one visit, and to calculate, for each full pattern, a total path value being the sum of accumulated value point scores for all visits with registered sequences forming said full path pattern.

It should be noted that a person skilled in the art would readily recognise that any feature described in combination with the first aspect of the invention could also be combined with the second aspect of the invention, and vice versa.

The system according to the second aspect of the invention may advantageously be used for performing the method according to the first aspect of the invention, and the remarks set forth above with reference to the first aspect of the invention are therefore equally applicable here.

The system may further comprise a storage device arranged on the server for storing the path patterns along with the total path values.

The system may be residing on the server having the website arranged thereon.

BRIEF DESCRIPTION OF THE DRAWINGS

The invention will now be described in further details with reference to the accompanying drawings in which.

DETAILED DESCRIPTION OF THE DRAWINGS

Figure 1:
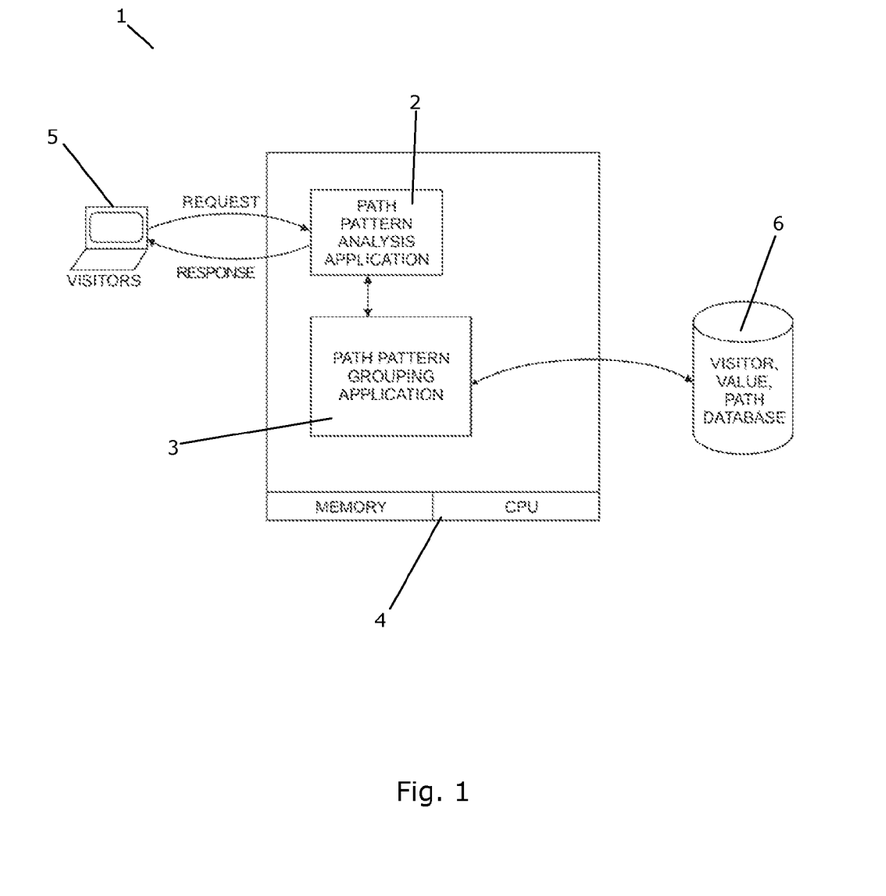
FIG. 1 is a diagrammatic view of a system according to an embodiment of the invention.

FIG. 1 is a diagrammatic view of a system 1 according to an embodiment of the invention. The system 1 is suited for being used for analysing traffic on a website. The system 1 comprises a path pattern analysis application 2 and a path pattern grouping application 3, both residing on a server 4.

A visitor, in the form of an analyst, accesses the website from a client device 5. Upon request from the analyst, data is delivered to the client device 5 by the path pattern analysis application 2, thereby allowing the analyst to perform analysis on the data. In FIG. 1 the client device 5 is illustrated as a personal computer (PC), but it should be noted that the client device 5 could alternatively be a cell phone, a tablet, or any other suitable kind of client device allowing the analyst to access the website.

The data supplied to the client device 5 by the path pattern analysis application 2 comprises path patterns generated on the basis of registered sequences of pages viewed and/or actions performed by visitors which have previously visited the website. The data further comprises information regarding accumulated value points for these visits. This will be described in further detail below with reference to FIG. 2.

The analyst assigns total value points to the paths of the path pattern in accordance with the accumulated value point scores. Furthermore, the analyst analyses the path patterns and assigned total value points in order to identify path which generate value for the website owner and paths which do not. The result of the analysis is communicated to the path pattern analysis application 2.

The path pattern analysis application 2 communicates the path patterns along with the total path values to the path pattern grouping application 3.

All of the path patterns, along with the corresponding total path values, are stored in a visitor, value, path database 6 which is capable of communicating with the path pattern grouping application 3. Thus, the path pattern grouping application 3 can communicate new path patterns and total path values to be stored to the visitor, value, path database 6, and the visitor, value, path database 6 can communicate previously stored path patterns and total path values to the path pattern grouping application 3 for further analysis.

During the analysis performed by the analyst complex path patterns involving sequences registered during several visits are built. These complex path patterns are stored in the visitor, value, path database 6. The complex path patterns provide information regarding value generated by visitors following various paths through the website. It further provides information regarding which paths appear to generate high value, and which do not. The website owner or manager can use this information for adjusting the website in order to increase the total value generated for the website owner by the visitors.

Figure 2:
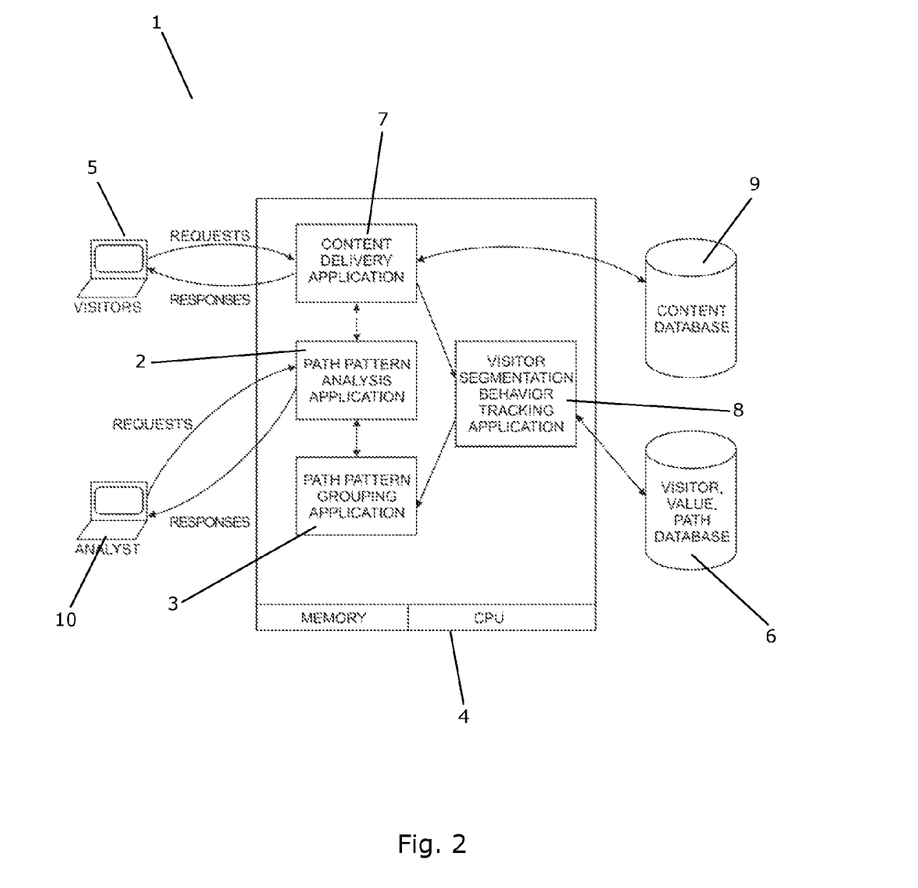
FIG. 2 is a diagrammatic view of a system according to another embodiment of the invention.

FIG. 2 is a diagrammatic view of a system 1 according to another embodiment of the invention. The system of FIG. 2 could advantageously form part of or cooperate with the system 1 of FIG. 1.

The system 1 of FIG. 2 comprises a content delivery application 7, a path pattern analysis application 2, a path pattern grouping application 3 and a visitor segmentation behaviour tracking application 8, all residing on a server 4. It should be noted that the applications 2, 3, 7, 8 could, alternatively, be residing on two or more separate servers. The system 1 is also suited for being used for analysing traffic on a website.

A visitor accesses the content of the website from a client device 5, and the content delivery application 7 delivers content to the client device 5 upon request from the visitor, thereby allowing the visitor to view desired content and/or perform desired actions within the website. The content is supplied to the content delivery application 7 by a content database 9. The visitor segmentation behaviour tracking application 8 monitors the navigations and/or actions performed by the visitor. During this, the visitor segmentation behaviour tracking application 8 registers a sequence of pages viewed by the visitor and/or actions performed by the visitor during the visit. The registered sequence is communicated to the path pattern grouping application 3, and based on the registered sequence, the path pattern grouping application 3 builds a path pattern.

The visitor segmentation behaviour tracking application 8 further monitors the navigations and/or actions performed by the visitor, while accumulating value points for the visit. The value points are accumulated in accordance with the content viewed by the visitor and/or actions performed by the visitor during the visit. Previously, the content of the website has been associated with value point settings reflecting the value generated for the website owner when a visitor encounters specific content of the website. Thus, when a visitor views a specific piece of content or performs a specific action, value points corresponding to the viewed content or performed action are added to the value point score for the visit. Accordingly, when the visit is completed, an accumulated value point score has been obtained, and the accumulated value point score represents the value generated for the website owner during the visit. The accumulated value point score is assigned to the path pattern as a total path value. Thus, the total path value of a path pattern represents the value generated for the website owner during a visit where the visitor followed the path defined by the path pattern.

The visitor segmentation behaviour tracking application 8 communicates with a visitor, value, path database 6 which stores path patterns and total path values. Thus, the visitor segmentation behaviour tracking application 8 supplies new path patterns to the visitor, value, path database 6 for storage, and it receives stored path patterns from the visitor, value, path database 6 for performing detailed analysis of new path patterns and/or for building more complex path patterns, as described above.

An analyst accesses the path pattern analysis application 2 from an analyst device 10, and the path pattern analysis application 2 delivers analysis data to the analyst device 10 upon requests from the analyst. Thereby the analyst is capable of obtaining information regarding the path patterns built by the path pattern analysis application 2 and the path pattern grouping application 3, as well as regarding the total path values assigned to these path patterns. Thereby the analyst can analyse the path patterns, e.g. in order to investigate which paths of the website generate value for the website owner and which do not. Once this has been established, the website owner or manager may adjust the website in order to encourage value generating behaviour of the visitors, and/or in order to remove inexpedient features of the website, thereby increasing the value generated for the website owner by the visitors.

Figure 3:
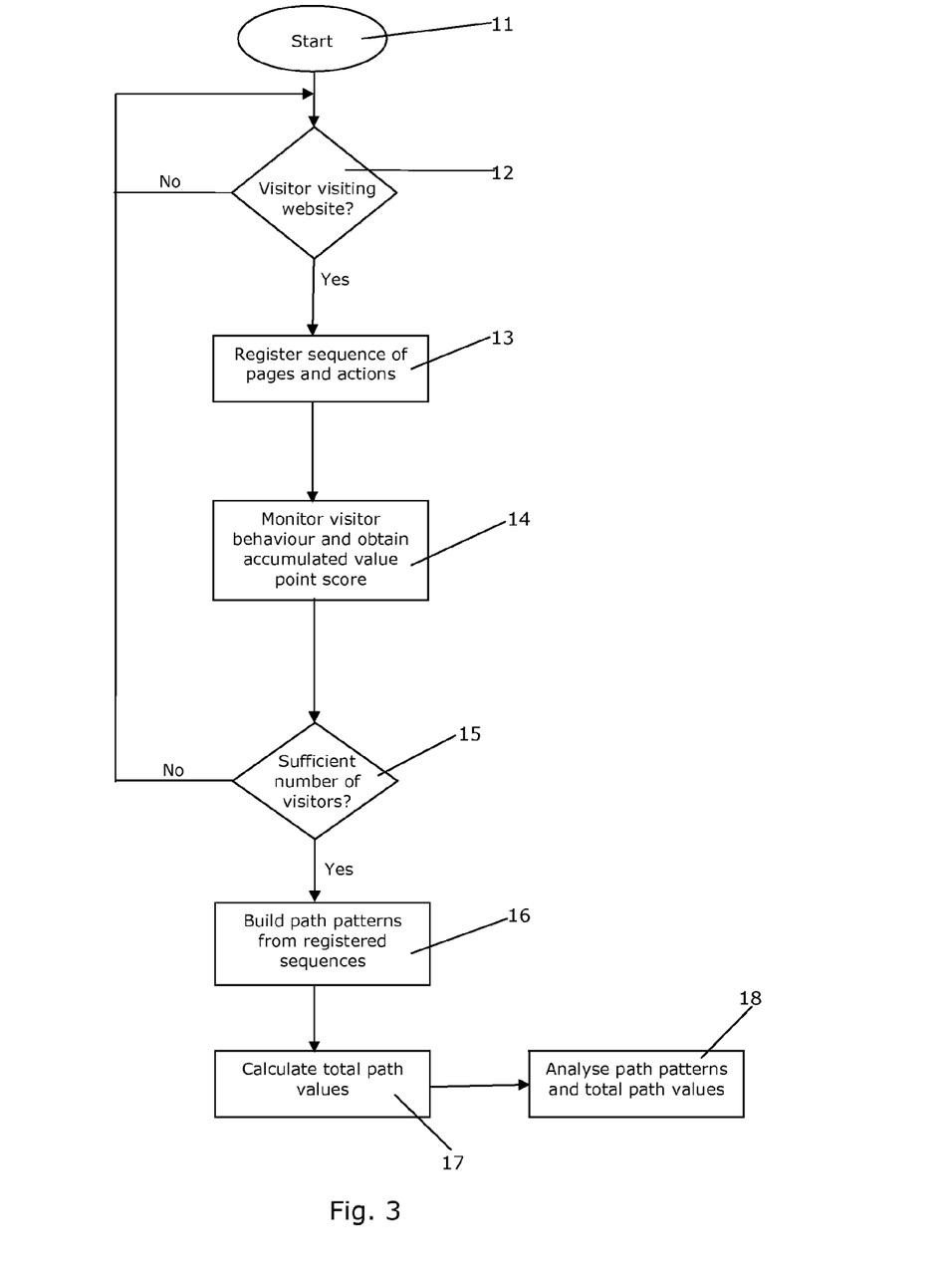
FIG. 3 is a flow diagram illustrating a method according to an embodiment of the invention.

FIG. 3 is a flow diagram illustrating a method according to an embodiment of the invention. The process is started at step 11. At step 12 it is investigated whether or not a visitor is visiting the website. If this is not the case, the process is returned to step 12, i.e. the website is monitored until a visitor is detected.

If step 12 reveals that a visitor is visiting the website, a sequence of pages visited by the visitor and actions performed by the visitor during the visit are registered at step 13. Accordingly, the registered sequence reflects the navigations and actions performed by the visitor during the visit, as well as the order in which these navigations and actions occurred.

At step 14 the behaviour of the visitor is monitored. This results in an accumulated value point score being obtained. Step 14 may be performed subsequently to step 13, or step 13 and step 14 may be performed simultaneously. The value points are accumulated in accordance with content viewed by the visitor and actions performed by the visitor, and in accordance with predefined value point settings associated with the content of the website. The value point settings have been assigned to the content previously, e.g. when the content was created, by the website owner or manager. The value point settings are selected in such a manner that they reflect value generated for the website owner when a visitor views specific content or performs specific actions. When a visitor visits the website, a value point score is accumulated by continuously adding values defined by the value point settings. Thus, when a visitor views a specific piece of content or performs a specific action, the value point setting associated with that specific piece of content or action is added to the value point score of the visit. When the visit is completed, an accumulated value point score has been generated, and the accumulated value point score reflects the total value generated for the website owner during the visit.

At step 15 it is investigated whether or not a sufficient number of visitors have visited the website, i.e. whether or not a sufficient number of registered sequences and accumulated value point scores have been obtained. If this is not the case, the process is returned to step 12 in order to obtain further registered sequences and accumulated value point scores.

In the case that step 15 reveals that a sufficient number of visitors have visited the website, path patterns are build from the registered sequences at step 16. The path patterns provide an overview of the navigations and actions performed by the visitors which were monitored. The path patterns include one or more full path patterns, a full path pattern corresponding to a complete registered sequence of at least one visit. Thus, a full path pattern corresponds to a complete visit and provides information regarding the navigations and actions performed during that visit, as well as the order in which they were performed. In the case that one or more additional visitors viewed pages and performed actions in the same order, the full path pattern will represent all of these visits. The path patterns may, e.g., be in the form of an ordered tree data structure, such as a TRIE.

At step 17 total path values are calculated and assigned to the full path patterns of the path patterns. The total path value for a given full path pattern is calculated as the sum of accumulated value point scores for all visits with registered sequences forming that full path pattern. Accordingly, the path patterns with assigned full path values provides an overview of the navigations and actions performed by the visitors visiting the website, as well as of which paths generated value to the website owner and which did not.

At step 18 the path patterns and total path values are analysed, e.g. in order to identify paths of the path pattern which generate value to the website owner, and/or paths which do not. Using such information, it is possible for the website owner to adjust the website in such a manner that value generating behaviour is encouraged and/or in order to remove or adjust inexpedient features of the website thereby increasing the value generated for the website owner by the visitors visiting the website.

Figure 4:
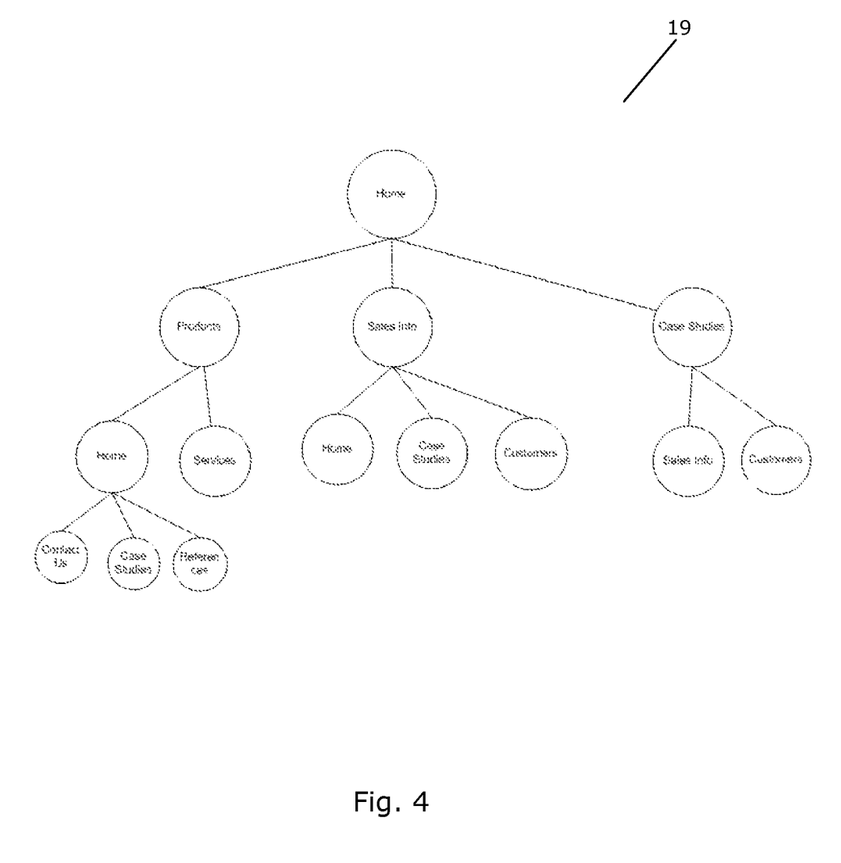
FIG. 4 is an ordered tree data structure built in accordance with a method according to an embodiment of the invention.

FIG. 4 is an ordered tree data structure 19, built in accordance with a method according to an embodiment of the invention. The ordered tree data structure 19 illustrates selected paths taken by a segment of visitors to a website. The website comprises eight web pages, i.e. Home, Products, Sales Info, Case Studies, Customers, References, Contact Us and Services. In the ordered tree data structure 19 of FIG. 4 all visits are started at the Home page. From the Home page the visitors navigated to the Products, Sales Info or Case Studies pages, these pages thereby constituting a level two of the website.

The visitors which navigated to the Products page from the Home page navigated further to either the Home or the Services page. Even though the Home page had already been visited, visiting this page again constitutes a further navigation, and thereby forms a level three of the ordered tree data structure 19 for these visitors.

Similarly, the visitors who navigated to the Sales Info page from the Home page navigated further to either the Home, the Case Studies or the Customers page, and the visitors who navigated to the Case Studies page navigated further to either the Sales Info or Customers page.

All the visits ended at level three, except the visits following the path Home—Products—Home. In this case the visitors navigated further to either the Contact Us, the Case Studies or the References page before terminating the visit.

In the ordered tree data structure 19 illustrated in FIG. 4, the web pages viewed by the visitors form nodes of the ordered tree data structure 19. In addition, some of the nodes of the ordered tree data structure 19 could be actions performed by the visitors during their visits. As mentioned above, some of the web pages occur several times in the ordered tree data structure 19, indicating that the visitors followed various paths to reach the same web page. For instance the Case Studies page occurs three times in the ordered tree data structure 19 as three different nodes, arranged at level two, level three and level four, respectively. Thus, some of the visitors who visited the Case Studies page navigated directly to the page from the Home page. Others navigated to the Sales Info page and then further to the Case Studies page. Finally, some of the visitors followed the path Home—Products—Customers—Case Studies.

The node where a visitor terminates his or her visit to the website is designated and exit node.

When the ordered tree data structure 19 has been built, analysis can be performed on the ordered tree data structure 19 in order to extract valuable information regarding the behaviour of the visitors during their visits. In the following further details regarding the analysis of the ordered tree data structure 19 will be described with reference to FIGS. 5 and 6.

Figure 5:
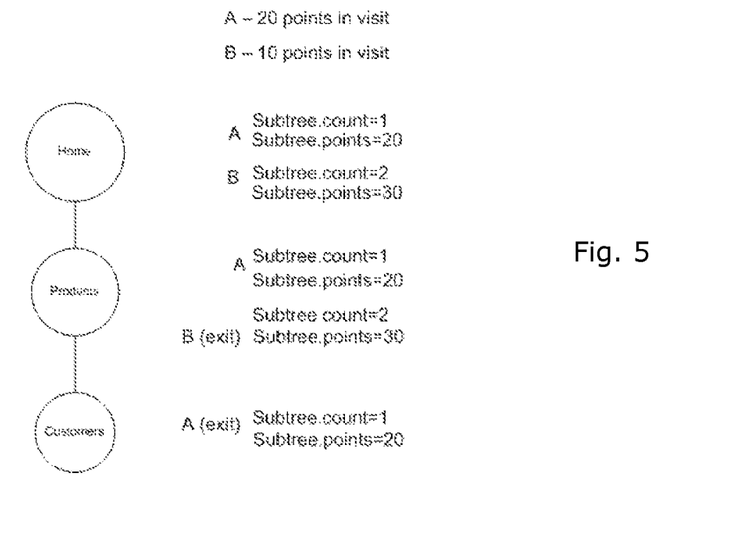
FIG. 5 illustrates calculation of node points in a part of an ordered tree data structure.

FIG. 5 illustrates calculation of node points in a part of an ordered tree data structure similar to the structure 19 of FIG. 4. In FIG. 5 a path comprising three nodes, i.e. Home, Products and Customer, is shown. Two visitors, A and B, visited the website. Visitor A accumulated 20 value points during his or her visit, and visitor B accumulated 10 value points. Visitor A entered the website at the Home page, navigated to the Products page and further on to the Customers page where the visit was terminated, i.e. the Customers page is the exit node for visitor A's visit.

Visitor B also entered the website at the Home page and navigated to the Products page, where the visit was terminated, i.e. the Products page is the exit node for visitor B's visit.

Visitor B's visit occurred later than visitor A's visit.

A node point and a node count are assigned to each of the nodes. The node point is the sum of the accumulated value points of all visits which included the node. The node count is the total number of visits to the node.

Thus, after visitor A's visit the node count of the Home page is 1 and the node point is 20, i.e. the accumulated value points for visitor A's visit. This is also the case for the Products page and the Customers page.

After visitor B' visit the node count of the Home page is 2, since visitor A as well as visitor B has visited the Home page. The node value of the Home page is 30, i.e. the sum of the accumulated value points for visitor A and the accumulated value points for visitor B. The node count for the Products page is also 2 and the node value is 30, since visitor A as well as visitor B has also visited the Products page. However, the node count of the Customers page remains 1 and the node value remains 20, since visitor B terminated the visit at the Products page, and therefore did not visit the Customers page.

Figure 6:
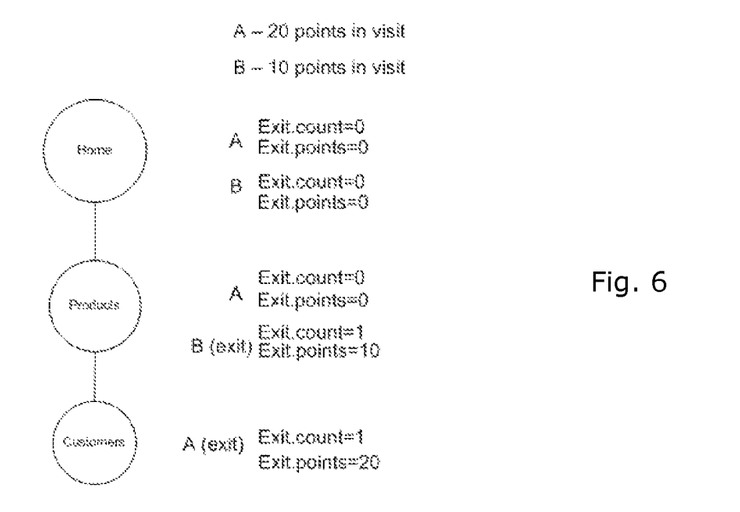
FIG. 6 illustrates calculation of exit points in a part of an ordered tree data structure.

FIG. 6 illustrates calculation of exit points in the ordered tree data structure part of FIG. 5, based on the same visits by visitor A and B as described above with reference to FIG. 5. An exit point and an exit count are assigned to each of the nodes. The exit point is sum of the accumulated value point scores for the visits being terminated at the node. The exit count is the number of visits being terminated at the node.

After visitor A's visit the exit counts and the exit points for the Home page and the Products page are 0, since visitor A did not terminate his or her visit at these nodes. However, the exit count of the Customers page is 1 and the exit point is 20, i.e. the accumulated value point score of visitor A's visit, since this is the node where visitor A terminated his or her visit.

After visitor B's visit, the exit count and the exit point of the Home page remain 0, since visitor B did not terminate his or her visit at this node. The exit count of the Products page is 1 and the exit value is 10, i.e. the accumulated value point of visitor B, since this is the node where visitor B terminated his or her visit. The exit count of the Customers page remains 1 and the exit point remains 20.

Assigning node values, node counts, exit values and/or exit counts to the nodes of an ordered tree data structure representing visits to a website allows the website owner or manager to analyse the paths taken by the visitors, and to determine which paths create value to the website owner and which do not. Once this has been established, the website owner or manager may adjust the website in order to lead visitors towards the value generating paths or web pages and/or in order to avoid leading visitors towards the paths or web pages which do not generate value or which only generate low value.

The invention claimed is:

1. A method for analysing traffic on a website, the website being arranged on a server, the method comprising the steps of:
   allowing a plurality of visitors to visit the website,
   for each visit, registering a sequence of pages viewed by the visitor and/or actions performed by the visitor during the visit,
   for each visit, monitoring navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit, the accumulated value point score reflecting the value points collected by the visitor during the visit, defining a set of visits from the plurality of visits, building path patterns based on the visits of the set of visits, where the registered sequences form the path patterns, the path patterns including one or more full path patterns, each full path pattern corresponding to a complete registered sequence of at least one visit, and for each full path pattern, calculating a total path value being the sum of accumulated value point scores for all visits with registered sequences forming said full path pattern, the total path value for a given full path pattern thereby reflecting value points collected during all of the visits which followed the path of the full path pattern, the path patterns along with the calculated total path values thereby providing information regarding which registered sequences of pages and/or actions generate value and which do not; and redesigning the website to reinforce positive behaviour and diminish negative behaviour based on the information regarding which registered sequences of pages and/or actions generate value and which do not;

wherein the path patterns form an ordered tree data structure, wherein the pages and/or actions of the registered sequences form nodes of the ordered tree data structure;

wherein the method further comprises:

for each visit, defining an exit node as the node where the visit ends, and assigning an exit value to the exit node, the exit value being the accumulated value point score for the visit;

for each node, calculating a total exit value being the sum of all exit values assigned to the node;

assigning an exit count to each exit node, the exit count being the number of visits ending at said exit node; and for each exit node, calculating a total exit efficiency per visit being the total exit value divided by the exit count.

2. The method according to claim 1, further comprising the step of identifying a most efficient full path being the full path with the highest total path value per visit in the full path.

3. The method according to claim 1, further comprising the step of storing the path patterns along with the total path values in a storage device of the server.

4. The method according to claim 1, further comprising the steps of:

for each visit, storing information regarding navigations and/or actions performed by the visitor during the visit, along with the accumulated value point score of the visit, in a storage device of the server, and retrieving the stored information from the storage device prior to performing the step of building path patterns.

5. The method according to claim 1, wherein the path patterns further include at least one partial path pattern, each partial path pattern corresponding to a part of a registered sequence of at least one visit.

6. The method according to claim 5, further comprising the steps of:

analysing each partial path pattern, and for each partial path pattern, identifying a value point loss for said partial path pattern, based on the analysis step.

7. The method according to claim 1, wherein the path patterns further include at least one partial path pattern, each partial path pattern corresponding to a part of a registered sequence of at least one visit, and wherein the ordered tree data structure is formed by full path patterns as well as partial path patterns.

8. The method according to claim 1, further comprising the steps of:

for each visit, assigning a node value to each node visited during the visit, the node value being the accumulated value point score for the visit, and for each node, calculating a total node value being the sum of all node values assigned to the node.

9. The method according to claim 8, further comprising the step of assigning a node count to each node, the node count being the number of visits visiting said node.

10. The method according to claim 9, further comprising the step of, for each node, calculating a total node efficiency per visit being the total node value divided by the node count.

11. The method according to claim 8, further comprising the step of storing the ordered tree data structure along with the total node values in a storage device of the server.

12. The method according to claim 8, further comprising the step of analysing the ordered tree data structure and the node values.

13. The method according to claim 12, further comprising the step of identifying a most valuable full path of the ordered tree data structure, based on the analysis step.

14. The method according to claim 12, further comprising the step of identifying a most efficient full path of the ordered tree data structure, based on the analysis step.

15. The method according to claim 12, further comprising the step of identifying a most valuable node of the ordered tree data structure, based on the analysis step.

16. The method according to claim 12, further comprising the step of identifying a most efficient node of the ordered tree data structure, based on the analysis step.

17. The method according to claim 12, further comprising the step of for each node of the ordered tree data structure, identifying a value point loss for said node, based on the analysis step.

18. The method according to claim 1, further comprising the steps of:

identifying one or more statistically insignificant nodes of the ordered tree data structure, pruning the ordered tree data structure by removing said statistically insignificant node(s) and any descendant nodes of the statistically insignificant node(s) from the ordered tree data structure, and for each of the remaining nodes of the ordered tree data structure, assigning a prune value and a prune count being the sum of accumulated value points and visits of removed nodes descending from said node.

19. The method according to claim 1, further comprising the steps of:

at least one visitor filling out a set of form fields of a form during the visit, for each visitor, registering whether a form was dropped or submitted, and in the case that the form was submitted, registering whether the submission was a success or a failure.

20. The method according to claim 19, wherein at least the step of registering whether a form was dropped or submitted is performed on the basis of the set of filled out form fields and/or on interactive form feedback.

21. A system for analysing traffic on a website arranged on a server, the system comprising:
   a register adapted to register a sequence of pages viewed by a visitor and/or actions performed by a visitor during a visit to the website, and to monitor navigations and/or actions performed by the visitor during the visit while accumulating value points in accordance with content viewed by the visitor and actions performed by the visitor, and in accordance with predefined value point settings associated with content of the website, thereby obtaining an accumulated value point score for the visit, the accumulated value point score reflecting the value points collected by the visitor during the visit, and
   an analyser adapted
      to build path patterns based on the visits of a defined set of visits, where the registered sequences form the path patterns, the path patterns including one or more full path patterns, each full path pattern corresponding to a complete registered sequence of at least one visit,
      to calculate, for each full path pattern, a total path value being the sum of accumulated value point scores for all visits with registered sequences forming said full path pattern, the total path value for a given full path pattern thereby reflecting value points collected during all of the visits which followed the path of the full path pattern, the path patterns along with the calculated total path values thereby providing information regarding which registered sequences of pages and/or actions generate value and which do not, the website being redesigned based on the information regarding which registered sequences of pages and/or actions generate value and which do not to reinforce positive behaviour and diminish negative behaviour, wherein the path patterns form an ordered tree data structure,
   wherein the pages and/or actions of the registered sequences form nodes of the ordered tree data structure,
   wherein the analyser is further adapted
      to define, for each visit, an exit node as the node where the visit ends, and assigning an exit value to the exit node, the exit value being the accumulated value point score for the visit,
      to calculate, for each node, a total exit value being the sum of all exit values assigned to the node,
      to assign an exit count to each exit node, the exit count being the number of visits ending at said exit node, and
      to calculate, for each exit node, a total exit efficiency per visit being the total exit value divided by the exit count.

22. The system according to claim 21, further comprising a storage device arranged on the server for storing the path patterns along with the total path values.

23. The system according to claim 21, said system residing on the server having the website arranged thereon.

* * * * *